Jan. 29, 1929.  1,700,688
G. H. SHEFFIELD ET AL
CONSTRUCTION OF BOGIE TRUCKS FOR RAILWAY AND LIKE VEHICLES
Filed June 22, 1926   2 Sheets-Sheet 1
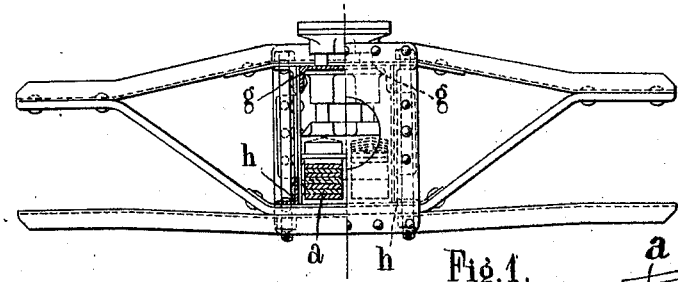
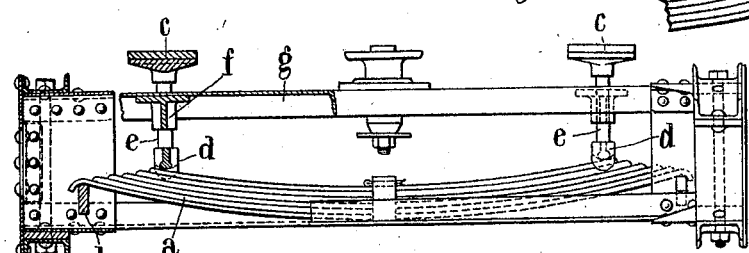
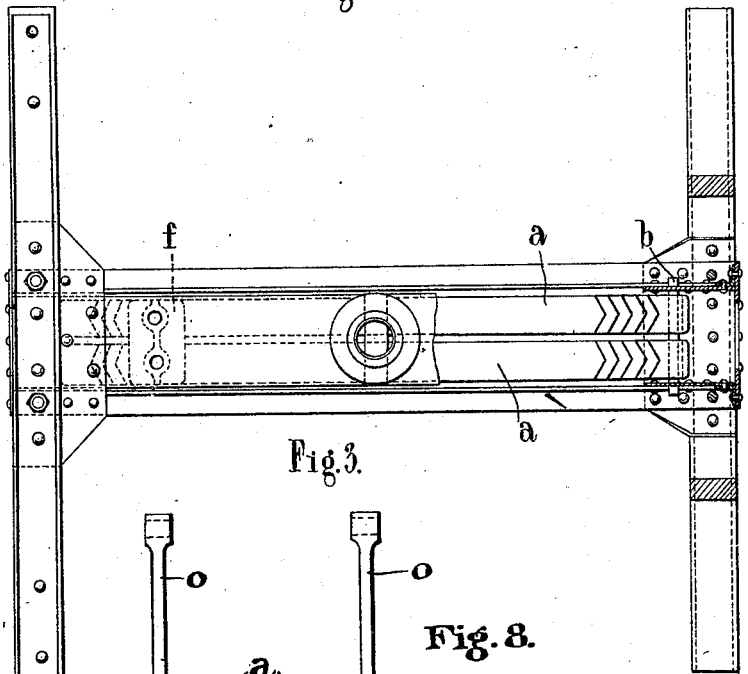
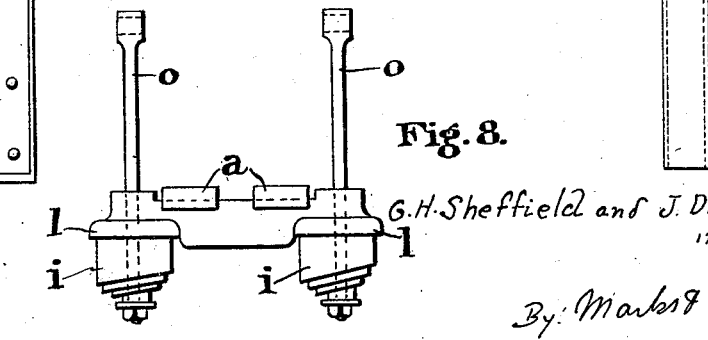
G. H. Sheffield and J. D. Twinberrow
inventors
By: Marks & Clerk
Att'ys Jan. 29, 1929. 1,700,688
G. H. SHEFFIELD ET AL
CONSTRUCTION OF BOGIE TRUCKS FOR RAILWAY AND LIKE VEHICLES
Filed June 22, 1926 2 Sheets-Sheet 2

G. H. Sheffield and J. D. Twinberrow
inventors
By: Marks & Clerk
Attys

Patented Jan. 29, 1929.

1,700,688

UNITED STATES PATENT OFFICE.

GEORGE HARRISON SHEFFIELD AND JAMES DENIS TWINBERROW, OF LONDON, ENGLAND, ASSIGNORS TO G. H. SHEFFIELD AND COMPANY, LIMITED, OF LONDON, ENGLAND.

CONSTRUCTION OF BOGIE TRUCKS FOR RAILWAY AND LIKE VEHICLES.

Application filed June 22, 1926, Serial No. 117,823, and in Great Britain June 30, 1925.

This invention relates to the construction of bogie trucks for railway and like vehicles of the kind in which the load is supported by springs arranged upon either side of the central pivot.

The object of the present invention is to improve the construction and arrangement of such bogie trucks in such a manner as will enable synchronous oscillation to be damped out while at the same time the bending moments on the transverse members of the truck framing will be very materially reduced as compared with existing arrangements of the nature to which the invention relates.

The invention consists in a bogie truck of the kind referred to in which the load is transmitted at two points to one or more laminated springs arranged transversely near the middle of the truck which supports the springs at each end.

The invention also consists in a bogie truck according to the preceding paragraph in which the points of application of the load to the transverse laminated springs lie within or in close proximity to the vertical planes through the centre of the side frames or of the journal bearings at each side of the vehicle.

The invention also consists in a bogie truck according to the penultimate paragraph in which the load is transmitted to the laminated springs through the medium of coil springs.

The invention also consists in other details and arrangements hereinafter described or indicated.

The accompanying drawings illustrate three modes of carrying out the invention.

Figure 1 is a part sectional longitudinal elevation of a portion of a bogie truck in accordance with the invention;

Figure 2 is a transverse view half in section and half in elevation, and

Figure 3 is a plan partly in section.

Figure 4:
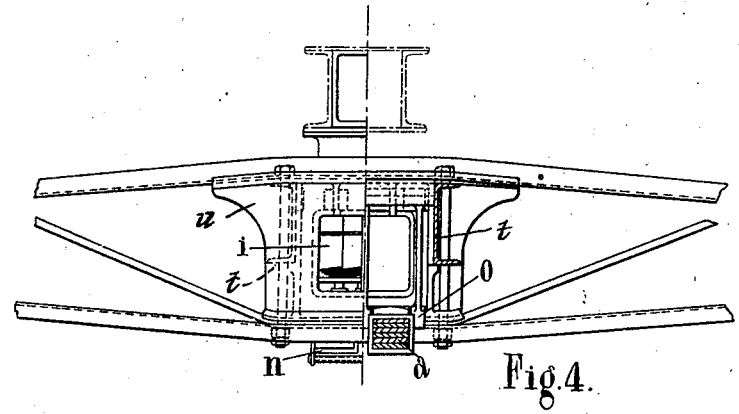
Figure 5:
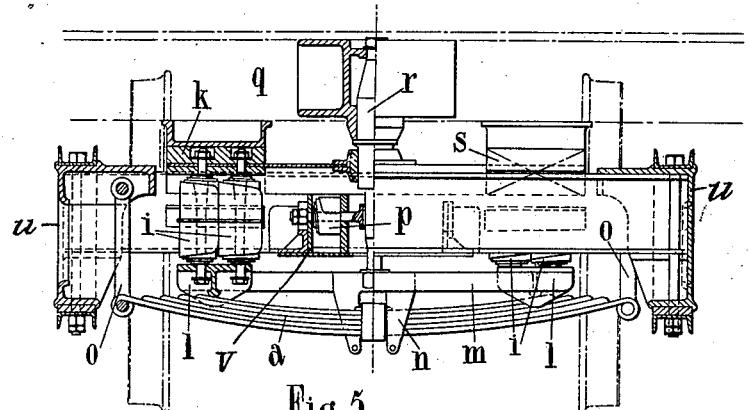
Figure 6:
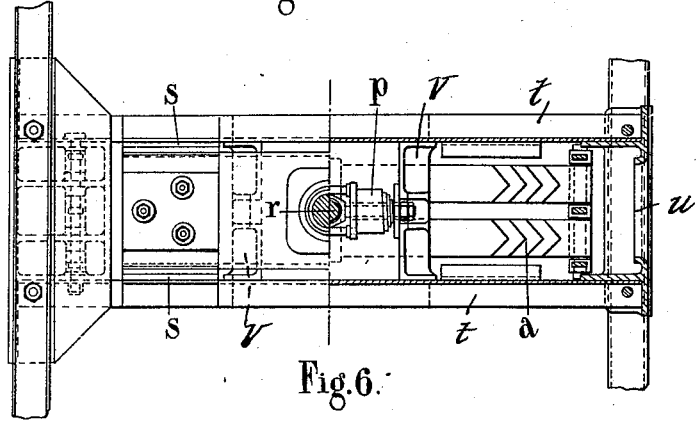

Figures 4, 5 and 6 are similar views to Figures 1, 2 and 3 showing a modified form of bogie truck in accordance with the invention, and Figures 7 and 8 are fragmentary views illustrating in side elevation and end elevation a modified arrangement of the springs in accordance with the invention.

In carrying our invention into effect in one convenient manner in its application to a bogie for freight cars and as illustrated in Figures 1 to 3, we provide two laminated springs $a$ arranged transversely near the middle of the truck, the ends of the springs being supported at $b$ in positions in close proximity to the centre lines through the side frames and bearings of the vehicle.

The springs are loaded through the side bearers $c$ and bearer bars $d$, the upper and lower parts being connected by short pillars $e$ passing through guides $f$.

The construction shown includes a novel form of construction of the transom or main transverse member which consists of three parts, an upper part $g$ and two lower parts $h$. The upper member is formed as a beam with the major axis of the section horizontal so as to afford great stiffness in transmitting buffer shocks and it is united to the side frames by gussets. The lower transverse members $h$ are spaced apart as shown in order to clear the springs $a$ and form a tie between the main frames at each side and also act as a truss to resist vertical bending moment on the cross members.

When adapting our invention to high speed passenger cars it is desirable to introduce coil springs in series with the transverse laminated springs, one such construction being shown by way of example in Figures 4 to 6. The coil springs $i$ (which may be of any suitable number) are arranged beneath the side bearing blocks $k$ and are supported by bearers $l$ adapted to rest upon and to engage with the transverse laminated springs $a$. The bearers are rigidly connected together by bars $m$ which are also fitted to engage with the spring buckles $n$ in order to prevent lateral displacement of the springs.

For the purpose of providing for lateral play of the bogie trucks the ends of the laminated springs $a$ may be connected to the side frames by swing links $o$ or any other suitable means may be adopted for the purpose and the amount of such lateral play may be controlled by suitably inclining the swing links or by the use of check springs $p$ or by both means in combination or by the aid of any other suitable devices.

The side bearers and upper springs are not guided in the transom of the bogie frame but are attached to a bolster $q$ of convenient form with suitable engagements on the pivot pin $r$ and provided with rubbing plates $s$ or their equivalent so that it may play freely in a vertical and in a lateral direction under the action of the bearing springs and of the mechanism controlling the lateral play.

The side frames are connected together by cross members $t$ to which, and to the side frames, are attached apertured end plates $u$. Bearing on each side of the pivot pin $r$ are the check springs $p$ previously referred to, these being anchored at each end to beams $v$ connecting the cross members $t$. Lateral swing therefore of the bolster $q$ and the spring suspension arrangement will therefore be checked and controlled by the springs $p$.

When employing the coil bearing springs we may either arrange the same above the laminated springs as shown in Figures 4 and 5 or we may vary the position by placing the same beneath the ends of the swing links supporting the main transverse laminated bearing springs as shown in Figures 7 and 8.

It is to be understood that our improved arrangement of transverse laminated springs with the load applied thereto at two points and with the reaction also taken through two points may be employed with other designs of bogie truck in addition to those illustrated herein by way of example, and the invention is not to be limited to the precise details hereinbefore given as we may vary the number and mode of disposition of the laminated bearing springs as also the means adopted for transmitting the load thereto depending upon the design of bogie truck to which the invention is to be applied or any practical requirements that may have to be fulfilled. The transverse laminated springs and their supports may be applied to existing design of bogie trucks in substitution for the bolster trays or spring planks with swing links as commonly used.

Having now described our invention, what we claim as new and desire to secure by Letters Patent is:—

1. A bogie truck comprising side frames, transverse leaf springs supported at both their ends by said side frames, and means for supporting the load at two points only on said springs.

2. A bogie truck comprising side frames, transverse leaf springs on either side of the centre line of said frames, said springs being supported at each end by said frames, and means for transmitting the load to two points only of each of said springs.

3. A bogie truck comprising two side frames, two transverse leaf springs whose ends are supported by said side frames, and means for supporting the load solely at two points of each of said springs, said points being intermediate the centre and the ends thereof.

4. A bogie truck comprising side frames, a transverse member therebetween, leaf springs beneath said transverse member supported at their ends by said side frames, load bearing means passing through said transverse member and resting on said leaf springs at points intermediate the centre and ends thereof.

5. A bogie truck according to claim 1 in which the load is supported upon said leaf springs through intermediate coil springs.

6. A bogie truck according to claim 2 having side bearer blocks interconnected by means of coil springs with bearers which transmit the load to said leaf springs.

7. A bogie truck comprising side frames, transverse leaf springs supported therefrom by swing links, and means for bearing the load solely at two points on said springs intermediate the centres and ends thereof.

8. A bogie truck comprising side frames, transverse leaf springs supported at their ends by swing links thereon, bearer blocks and bearers having coil springs therebetween, said bearers resting upon said leaf springs at two points intermediate the centre and ends thereof, at which points the load is solely supported by said leaf springs.

9. A bogie truck according to claim 8 having means for controlling the lateral play of the swing links.

10. A bogie truck according to claim 8 having in combination therewith a coil spring for controlling the lateral play of said leaf springs.

11. A bogie truck comprising side frames, two leaf springs on either side the centre line thereof and supported therefrom by swing links, bearer blocks adapted to bear the load and transmit the same to bearers which rest upon said leaf springs at points near the ends thereof, a plurality of coil springs between said bearer blocks and said bearers and transverse bars connecting said bearers.

12. A bogie truck according to claim 11 having in combination therewith a plurality of horizontal coil springs for controlling the lateral play of the swing links.

13. A bogie truck according to claim 7 having in combination therewith coil springs between said swing links and said leaf springs.

14. A bogie truck according to claim 1 in which vertically acting springs are provided through which and the leaf springs the load is transmitted to the side frames.

15. A bogie truck according to claim 7 having vertically acting springs, the load being transmitted to the side frames serially through the links, the vertically acting springs and the leaf springs.

In testimony whereof we have signed our names to this specification.

GEORGE HARRISON SHEFFIELD.
JAMES DENIS TWINBERROW.

CERTIFICATE OF CORRECTION.

Patent No. 1,700,688.  Granted January 29, 1929, to

GEORGE HARRISON SHEFFIELD ET AL.

It is hereby certified that the assignee in the above numbered patent was erroneously described and specified as "G. H. Sheffield and Company, Limited, of London, England" whereas said assignee should have been described and specified as "G. H. Sheffield and Company, (Engineers), Limited, of London, England", as shown by the records of assignments in this office; and that the said Letters Patent should be read with this correction therein that the same may conform to the record of the case in the Patent Office.

Signed and sealed this 9th day of April, A. D. 1929.

(Seal)

M. J. Moore,
Acting Commissioner of Patents.